May 26, 1953 J. P. KOVACS 2,639,783
OIL FILTER AND PRESSURE REGULATION SYSTEM FOR ENGINES
Filed Aug. 3, 1951 2 Sheets-Sheet 1
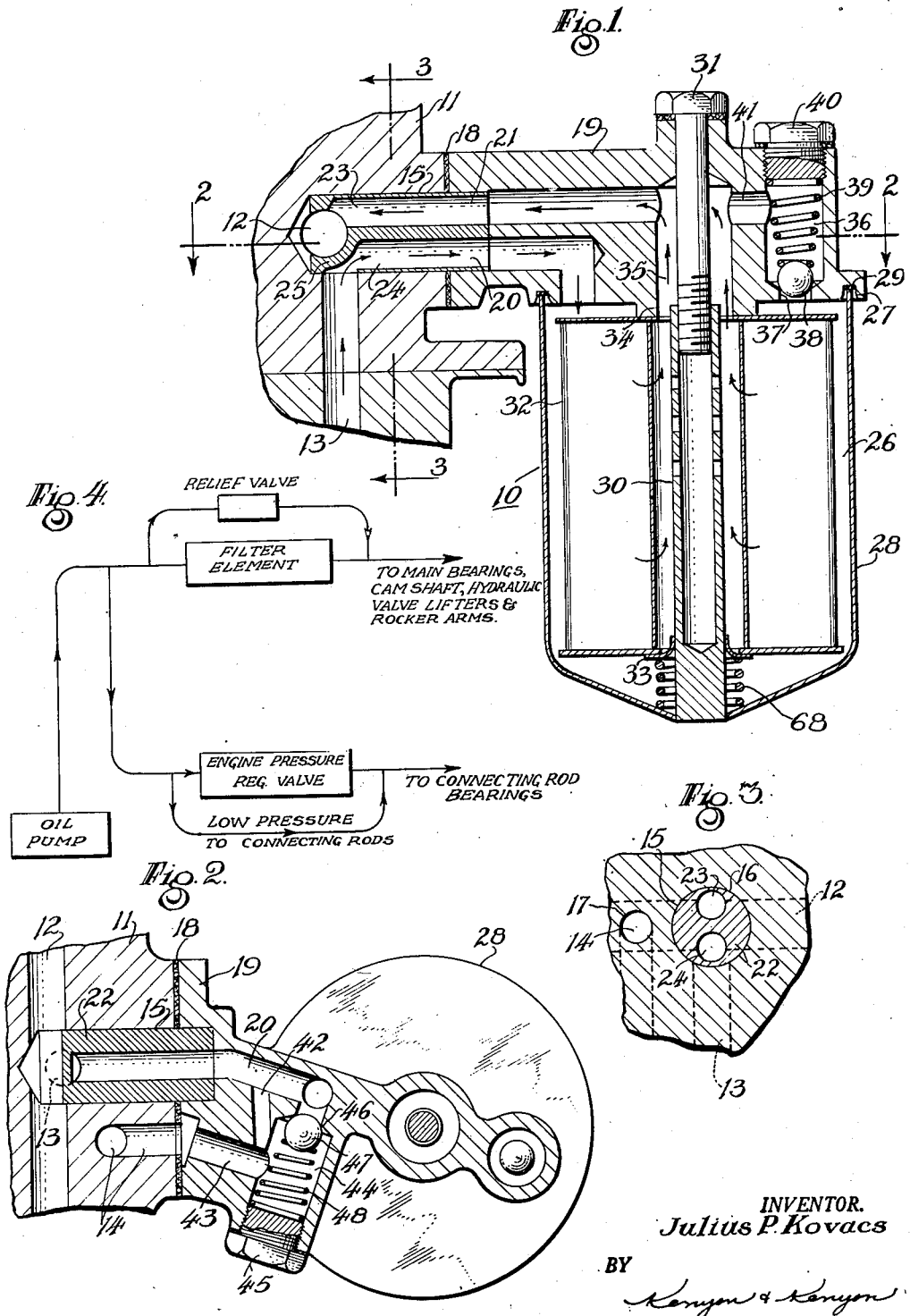

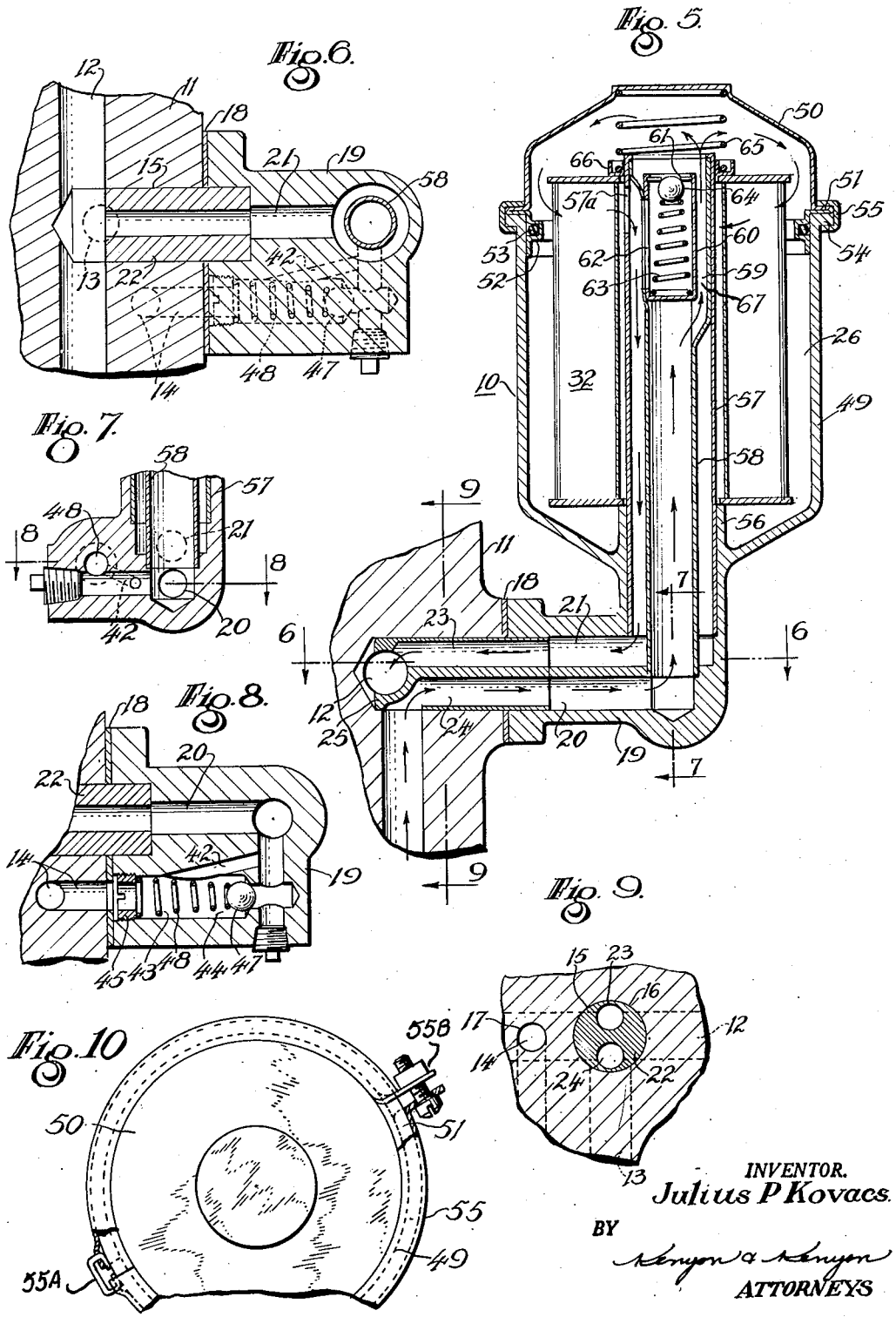

Patented May 26, 1953

2,639,783

UNITED STATES PATENT OFFICE 2,639,783

OIL FILTER AND PRESSURE REGULATION SYSTEM FOR ENGINES

Julius P. Kovacs, Newark, N. J., assignor to Pur-Olator Products, Inc., Rahway, N. J., a corporation of Delaware Application August 3, 1951, Serial No. 240,137

6 Claims. (Cl. 184—6)

1

It is the principal object of this invention to provide an improved oil filter and pressure-regulation system for engines, particularly commercial automotive engines of the type having a main oil duct leading from the oil pump to engine elements which are to be pressure lubricated by oil from the pump, and a secondary duct which leads oil, usually at a lower pressure, to the connecting rods. These ducts have openings in a face of the engine block through which oil may be delivered to the improved filter-pressure regulating unit of this invention, the unit being affixable to the block by suitable means. It is a further object of the invention to provide a construction for such a filter-pressure regulating unit which is simplified for purposes of easy assembly, repair and replacement of its various parts, particularly replacement of the expendable filter of the kind common in commercial practice.

The full nature of the invention, together with all of its objects and the advantages thereof may best be understood by reference to the following description of several illustrative embodiments thereof which are depicted graphically in the annexed drawings.

In the drawings:

Figure 1 is a vertical cross-sectional view through a preferred filter-pressure regulating unit which is indicated as though in its normal, vertical position attached to an engine block;

Figure 2 is a horizontal sectional view along the line 2—2 of the Figure 1;

Figure 3 is a vertical sectional view as though along the line 3—3 of Fig. 1;

Figure 4 is a schematic illustration of the functioning relationships of the unit within an automotive engine;

Figure 5 is a cross-sectional view similar to that of the Figure 1 but through an alternative embodiment;

Figure 6 is a horizontal sectional view along the line 6—6 of the Figure 5;

Figure 7 is a vertical sectional view along the line 7—7 of the Figure 5;

Figure 8 is a horizontal sectional view along the line 8—8 of the Figure 7;

Figure 9 is a vertical sectional view along the line 9—9 of the Figure 5.

Figure 10 is a fragmentary top view of Figure 5.

In view of the similarity of parts, like numerals have been used to designate like parts throughout.

Referring now to the Figure 1 the filter-pressure regulating unit indicated generally by the numeral 10 is shown as affixed to an engine block 11 which has therein a conventional main oil duct 12 leading from the output or pressure end of the oil pump to engine elements which are to be pressure-lubricated by the oil from the pump, such as the main bearings, cam shaft, hydraulic valve lifters and rocker arms. This duct 12 may, for example, be considered as running horizontally through the block and as being supplied by a vertical duct 13 communicating with the pump. Also, in the block 11 is a connecting rod duct 14 (see Figure 2) for the delivery of low-pressure oil to the connecting rods; this duct 14 opening in the vertical face of the block 11 for purposes to be indicated below. Similarly, there is provided in the block 11 a filter duct 15 which opens in the vertical face of the block 11 and intersects the ducts 12 and 13 at their point of intersection. The openings of the duct 15 and the connecting rod duct 14 in the face of the block 11 are designated respectively 16 and 17 (see Figure 3). The purpose of this arrangement by which the ducts open in the face of the block is to make it possible to attach the unit 10 to the block 11 in such manner that the openings 16 and 17 will be aligned with appropriate channels in the unit 10 for the purposes presently to be indicated. It will be understood that the unit 10 may be affixed to the block 11 by bolts or other suitable means, with a suitable liquid-proof gasket 18 sealing the juncture.

The unit 10 is constructed around its base 19 of metal or other suitable material provided with the bores, ducts, etc., as follows: In the base 19 and aligned with the opening 16 are the reversed flow passages comprising a filter input channel 20 which receives oil from the intersection point of the main duct 12 and duct 13 for passage through the filter pressure regulating unit 10, and a filter unit output channel 21 which passes filtered oil back to the duct 12 for transmission to the engine elements to be lubricated under pressure. It will be observed that the construction here includes a means for intercepting and diverting oil at the intersection point of the main duct 12 and the duct 13 and forcing all of it into the unit 10, no oil flowing directly from the duct 13 to the main duct 12. After the diversion and passage through the unit 10, this means permits the oil to be returned to the main duct 12 so that it may resume its passage to the engine elements to be pressure lubricated. This means in the embodiment shown takes the form of the interceptor block 22 (see Fig. 2) which is generally cylindrical in shape so that it may be inserted in duct 15 in a tight sealing fit with the walls thereof (see Figure 3), and it is provided with longitudinal channels 23 and 24 constituting portions or extensions respectively of the channels 21 and 20, as well as an inward lip portion 25 which blocks all direct communication between the ducts 13 and 12 and provide two passages, one between the duct 13 and the channel 24 and the other between channel 23 and duct 12. This interceptor block 22 may be removably inserted within the base 19 as well as block 11. As best illustrated by the Figure 1, oil from the duct 13 flows through the channels 24 and 20 into a filter chamber 26 constructed as follows:

In the downward face of base 19 there is formed an annular groove 27 adapted to receive the upper end of a cylindrical cup-shaped housing 28 with the sealing gasket 29 interposed. Housing 28 is fluid-tight and when drawn tightly against the base 19 will form the oil-tight chamber 26 therewith. This is accomplished by means of the central perforated hollow stem 30 of the housing 28 which is threaded at its upper end to receive a bolt 31 extending in sealed relation through the base 19 as indicated. It will be understood that a tightening of the bolt 31 will draw the housing 28 tightly against the base 19. Within the chamber 26 there is provided a conventional expendable filter element 32, of paper or the like, annular in form, and which may rest concentrically on the annular shoulder or shelf 33 which is slideable on the stem 30 and supported by compression spring 68, and thus be drawn tightly and concentrically against the annular shelf or shoulder 34 of the base 19.

Since channel 20 opens in the downward face of base 19 outside of shoulder 34, it will be seen that incoming oil to be filtered will be forced to pass through the filter element 32 before it can proceed to the outlet channel 21 by way of the annular channel 35 between the bolt 31 and the walls of an appropriate cylindrical bore opening in the downward face of the base 19 and within shoulder 34. The arrows indicate the direction of oil flow. In order to avoid the undesirable consequences of a blockage of oil flow in the high pressure passages, if the filter element 32 or the whole chamber 26 should become clogged as by lack of operator attention, there is provided in the base 19 a filter relief valve constructed as follows: A vertical bore or relief duct 36 opening in the upper and lower faces of the base 19 and communicating with the chamber 26 is provided with a valve seat 37 and a cooperating valve head in the form of a ball 38. The valve thus formed is normally closed by means of the compression spring 39 which biases the ball into engagement with the valve seat, the upper part of the spring being held in position by the bolt 40 threaded into the bore 36. An extension 41 of the channel 21 permits communication between the channel 21 and the duct 36. It will be understood that with this arrangement oil may flow directly from the channel 20 around shoulder 34 to the vicinity of the valve seat 37 and thence through the relief valve if the filter channel is blocked. The compressive force of the spring 39 may be adjusted to a suitable predetermined value such that flow through relief duct 36 will not take place unless a predetermined oil pressure corresponding to a predetermined clogged filter condition exists.

In order to supply a desired amount of oil to the connecting rods at relatively low pressure, there is provided in the base 19 a restricted duct or channel 42 (see Fig. 2) leading from the inlet channel 20 to a connector duct 43 which in turn leads to the connecting rod duct 14 by virtue of its alignment therewith. The channel is of limited cross-section so that it may permit a predetermined amount of oil to flow to the connecting rods and yet will not unduly lower the pressure in the inlet channel 20 i. e. in the high pressure passages of the system. However, since it is desirable that the pressure throughout the system never rise above a predetermined safe value, e. g. 15 pounds per square inch, there is provided a by-pass duct and pressure regulating valve construction as follows: Shunted around the passage formed by the channel 42 and the duct 43, is an engine pressure regulating duct or bore 44 in the base 19 communicating with both the inlet channel 20 and the duct 43. Its outer end is closed and sealed by the bolt 45. Near the inner end, the engine pressure regulating duct or bore 44 is provided with a valve seat 46 cooperating with a valve head in the form of the ball 47 biased toward the valve seat by the compression spring 48. This spring will be so adjusted as to permit the oil pressure to open the valve at some predetermined value, e. g. 15 pounds per square inch, at which time additional oil will flow from channel 20 to the connecting rod duct 14. This overflow will serve to regulate the pressure of the entire system and keep it near its predetermined normal value.

The functional relationships of the system are illustrated in a self-explanatory manner by the Figure 4.

In the embodiment illustrated by the Figure 5, the functional relationships are the same, i. e. in accordance with the diagram of the Figure 4, but the structure is somewhat different. In this case, the input and output channels 20 and 21 in the base 19, as well as the interceptor 25 are substantially the same as in the Figure 1 embodiment. As best indicated by the Figure 8, the structure of the pressure regulating system is likewise substantially the same except bolt 45 is hollow.

However, in this embodiment, the filter chamber 26 is formed by an upwardly extending cylindrical cup member 49 on the base 19. The chamber may be closed by an inverted cup-shaped cover 50 having a lower peripheral rim structure as follows: With a view to facilitating the attachment of the cover 50 to the member 49, this rim structure takes the form of an outwardly extending peripheral flange 51 integral with the metallic structure of the cover 50 and folded back inwardly on itself as the drawing indicates to form a peripheral channel 52 in which there may be inserted a sealing ring 53 which is preferably of resilient material such as rubber and circular in cross-section. When the cover 50 is inserted in and on the member 49 in the position indicated by the Figure 5, the flange 51 will rest on a corresponding peripheral flange 54 on the member 49 and the ring 53 will be in firm sealing contact with the wall of the member 49. Suitable clamping means such as an annular channel member 55 may be employed to clamp the cover 50 firmly to the member 49. Member 55, as Fig. 10 indicates, is in two hinged semi-circular parts hinged by link 55A at one set of adjacent ends and clamped together by nut-bolt mechanism 55B at the other.

The member 49 is provided with a central upwardly extending annular ledge 56 upon which the annular filter element 32 may rest coaxially therewith. Coaxial with and inserted within the ledge 56 is a tube 57 which is perforated at 57A near the top end, as shown in Fig. 5. Coaxially positioned within tube 57 is a second tube 58 constituting an extension of the inlet channel 20. The upper end of this tube 58 is widened as indicated at 59 so that there may be inserted in the tube 58 a filter relief valve mechanism comprising the tube 60 which is closed except for openings 61 constituting a valve seat and 62 constituting a passage from the center of the tube 60 to the annular channel between tubes 57 and 58, i. e. the channel which constitutes an extension of the outlet channel 21. Biased against the rim of openings 61 by the compression spring 63 is a ball 64 constituting a valve head co-operating with the opening 61.

In order that the filter element 32 may be conveniently replaced, it is held in position concentrically with the tubes 57 and 58 by means of a compression spring 65 pressing against the cover 50 at the upper end and against an annular collar 66 at the other, the collar 66 firmly engaging the upper end of the filter element 32. It will be seen that the filter element may be simply replaced by removing the clamp 55, and then the cover assembly consisting of the following parts: The cover 50, the spring 65, together with the collar 66. In that event, the filter element 32 will readily slide out of the structure.

In operation, oil coming from the duct 13 and which in the absence of the filter-pressure regulating unit 10 would normally flow directly to the duct 12, is intercepted by the interceptor 25 and caused to flow through the inlet channel 20, through the center of tube 58, through the space 67 between tube 58 and tube 60, and thence in the direction indicated by the arrows through the filter element to the annular space between the tubes 57 and 58, back to the engine block by way of the output channel 21. If the filter element 32 should become clogged, the relief valve which is set to operate at some predetermined pressure corresponding to the clogged filter condition, will open by downward oil pressure on the ball 64 and in that event the oil may flow directly through the opening 62 into the annular space between tubes 57 and 58 to the outlet channel 21. Pressure regulation will be accomplished in a manner similar to that previously indicated. Normally, as when the engine is idling, a predetermined amount of oil will flow under low pressure through the duct 42 (see Fig. 8) and thence to the connecting rods, the duct 42 being of small enough cross-section that there will be no substantial drop in the pressure supplied to the main duct 12. If the pressure should rise excessively, the pressure regulating valve will open by movement of the ball 47 from its valve seat by virtue of the pressure, the spring 48 being given a sufficient amount of tension so that it will cause the valve to respond and open at some predetermined pressure such as 15 pounds per square inch.

I claim:

1. In combination with an engine block having a main oil duct for delivery of lubricating oil under pressure from an oil pump to engine elements to be pressure lubricated and a connect-rod duct for delivery of oil to connecting rods, said ducts having respectively main duct and connecting rod duct openings in a face of the engine block, a filter-pressure regulating unit comprising a base attached to the engine block over the said openings in the face of the block and having filter input and output channels aligned with the main duct opening, the filter input channel leading to the hereinafter-mentioned filter chamber and the filter output channel leading from the hereinafter-mentioned filter chamber, and an interceptor for diverting the full flow of oil from the oil pump in the main duct to the input channel and directing the flow of oil in the output channel back to the main duct for passage to the engine elements, means defining a filter chamber interposed in series with and between the input and output channels, a relief duct interposed in series between the input and output channels and a pressure openable relief valve normally closing the relief duct for establishing a by-pass around said filter chamber when clogged, a restricted duct in said base communicating with said input channel and a connector duct aligned with the connecting rod duct opening, an engine pressure regulating duct communicating with the input channel and said connector duct and a pressure openable pressure regulating valve in the pressure regulating duct for establishing a by-pass around the restricted duct upon the occurrence of a predetermined oil pressure.

2. In combination with an engine block having a main oil duct for delivery of lubricating oil under pressure from an oil pump to engine elements to be pressure lubricated and a connecting rod duct for delivery of oil to connecting rods, said ducts having respectively main duct and connecting rod duct openings in a face of the engine block, a filter-pressure regulating unit comprising a base attached to the engine block with a face of the base over the said openings in the face of the block and having filter input and output channels with openings in the face of the base aligned with the main duct opening, the filter input channel leading to the hereinafter-mentioned filter chamber and the filter output channel leading from the hereinafter-mentioned filter chamber, and an interceptor for diverting the full flow of oil from the oil pump in the main duct to the input channel and directing the flow of oil in the output channel back to the main duct for passage to the engine elements, means defining a filter chamber interposed in series with and between the input and output channels, a relief duct interposed in series between the input and output channels and a pressure openable relief valve normally closing the relief duct for establishing a by-pass around said filter chamber when clogged, said relief valve being openable upon the occurrence of a predetermined oil pressure rise corresponding to a predetermined degree of clogging of the filter chamber, a restricted duct in said base communicating with said input channel and a connector duct in said base, said connector duct having an opening in said base face aligned with the connecting rod duct opening, said restricted duct being restricted sufficiently to permit maintenance of normal lubricating pressure in said input channel, an engine pressure regulating duct communicating with the input channel and said connector duct and a pressure openable pressure regulating valve in the pressure regulating duct openable upon the occurrence of normal lubricating pressure in said input channel for establishing a by-pass around the restricted duct upon the occurrence of a predetermined oil pressure in said input channel.

3. For use with an engine block having a main oil duct for delivery of lubricating oil under pressure from an oil pump to engine elements to be pressure lubricated and a connecting rod duct for delivery of oil to connecting rods, said ducts having respectively main duct and connecting rod duct openings in a face of the engine block, a filter pressure regulating unit comprising a base for attachment to the engine block over the said openings in the face of the block and having filter input and output channels alignable with the main duct opening, the filter input channel leading to the hereinafter-mentioned filter chamber and the filter output channel leading from the hereinafter-mentioned filter chamber, and an interceptor insertable into the main duct for diverting the full flow of oil from the oil pump in the main duct to the input channel and directing the flow of oil in the output channel back to the main duct for passage to the engine elements, means defining a filter chamber interposed in series with and between the input and output channels, a relief duct interposed in series between the input and output channels and a pressure openable relief valve normally closing the relief duct for establishing a by-pass around said filter chamber when clogged, a restricted duct in said base communicating with said input channel and a connector duct in said base, the latter duct being alignable with the connecting rod duct opening, an engine pressure regulating duct communicating with the input channel and said connector duct and a pressure openable pressure regulating valve in the pressure regulating duct for establishing a by-pass through the regulating duct around the restricted duct upon the occurrence of a predetermined oil pressure.

4. For use with an engine block having a main oil duct for delivery of lubricating oil under pressure from an oil pump to engine elements to be pressure lubricated and a connecting rod duct for delivery of oil to connecting rods, said ducts having respectively main duct and connecting rod duct openings in a face of the engine block, a filter pressure regulating unit comprising a base for attachment to the engine block with a face of the base over the said openings in the face of the block and having filter input and output channels with openings in the face of the base alignable with the main duct opening, the filter input channel leading to the hereinafter-mentioned filter chamber and the filter output channel leading from the hereinafter-mentioned filter chamber, and an interceptor insertable into the main duct for diverting the full flow of oil from the oil pump in the main duct to the input channel and directing the flow of oil in the output channel back to the main duct for passage to the engine elements, means defining a filter chamber interposed in series with and between the input and output channels, a relief duct interposed in series between the input and output channels and a pressure openable relief valve normally closing the relief duct for establishing a by-pass around said filter chamber when clogged, said relief valve being openable upon the occurrence of a predetermined oil pressure rise corresponding to a predetermined degree of clogging of the filter chamber, a restricted duct in said base communicating with said input channel and a connector duct in said base, said connector duct having an opening in said base face alignable with the connecting rod duct opening, said restricted duct being restricted sufficiently to permit maintenance of normal lubricating pressure in said input channel, an engine pressure regulating duct communicating with the input channel and said connector duct, and a pressure openable pressure regulating valve in the pressure regulating duct openable upon the occurrence of normal lubricating pressure in said input channel for establishing a by-pass through the regulating duct around the restricted duct upon the occurrence of a predetermined oil pressure in said input channel.

5. For use with an engine block having a main oil duct for delivery of lubricating oil under pressure from an oil pump to engine elements to be pressure lubricated and a connecting rod duct for delivery of oil to connecting rods, said ducts having respectively main duct and connecting rod duct openings in a face of the engine block, a filter pressure regulating unit comprising a base for attachment to the engine block with a first face of the base over the said openings in the face of the block and having filter input and output channels with openings in the first face of the base alignable with the main duct opening and an interceptor insertable into the main duct for diverting the full flow of oil from the oil pump in the main duct to the input channel and directing the flow of oil in the output channel back to the main duct for passage to the engine elements, an annular shoulder projecting from a second face of the base, said input channel opening in said second face outside of said shoulder and said output channel opening in said second face inside said shoulder, a cup shaped filter housing detachably sealed against said second face with its open end over said shoulder and the latter openings of the input and output channels, means for securing an annular filter element between the bottom of the housing and the shoulder concentrically with the shoulder, a relief duct opening in the second face outside the shoulder but within the housing and communicating with the output channel and a pressure openable relief valve normally closing the relief duct for establishing a by-pass around said filter element when clogged, a restricted duct in said base communicating with said input channel and a connector duct in said base, said connector duct having an opening in the first base face alignable with the connecting rod duct opening, an engine pressure regulating duct communicating with the input channel and said connector duct and a pressure openable pressure regulating valve in the pressure regulating duct for establishing a by-pass through the regulating duct around the restricted duct upon the occurrence of a predetermined oil pressure.

6. For use with an engine block having a main oil duct for delivery of lubricating oil under pressure from an oil pump to engine elements to be pressure lubricated and a connecting rod duct for delivery of oil to connecting rods, said ducts having respectively main duct and connecting rod duct openings in a face of the engine block, a filter pressure regulating unit comprising a base for attachment to the engine block with a first face of the base over the said openings in the face of the block and having filter input and output channels with openings in the first face of the base alignable with the main duct opening and an interceptor insertable into the main duct for diverting the full flow of oil from the oil pump in the main duct to the input channel and directing the flow of oil in the output channel back to the main duct for passage to the engine elements, a cup shaped filter housing on said base and concentric tubes within the housing, the outer tube being perforated near one end of the tubes and the annular space between the tubes being closed at the one end of the tubes, said input channel leading into the inner tube at the other end and the output channel leading from the annular space between the tubes at the other end, a cover for the housing spaced from said one end of the tubes and means for securing an annular filter element between the cover and the bottom of the housing concentrically positioned around the outer tube over the perforations therein, a relief duct from the inner tube to the space between the inner and outer tube and a pressure openable relief valve normally closing the relief duct for establishing a by-pass around said filter element when clogged, a restricted duct in said base communicating with said input channel and a connector duct in said base, said connector duct having an opening in the first base face alignable with the connecting rod duct opening, an engine pressure regulating duct communicating with the input channel and said connector duct and a pressure openable pressure regulating valve in the pressure regulating duct for establishing a by-pass through the regulating duct around the restricted duct upon the occurrence of a predetermined oil pressure.

JULIUS P. KOVACS.

References Cited in the file of this patent

UNITED STATES PATENTS

| Number | Name | Date |
|---|---|---|
| 1,613,467 | Liddell | Jan. 4, 1927 |
| 1,806,537 | Bower | May 19, 1931 |

FOREIGN PATENTS

| Number | Country | Date |
|---|---|---|
| 258,410 | Switzerland | Aug. 1, 1949 |